United States Patent [19]

Bryant-Jeffries et al.

[11] Patent Number: 4,591,120

[45] Date of Patent: *May 27, 1986

[54] TILTABLE AND/OR ROTATABLE SUPPORT FOR DISPLAY DEVICE

[75] Inventors: Keith C. Bryant-Jeffries, Eastleigh; Ian Golledge, Romsey; John V. Pike, Winchester; Eric V. Vaughan, Eastleigh, all of England

[73] Assignee: International Business Machines Corporation, Armonk, N.Y.

[*] Notice: The portion of the term of this patent subsequent to May 27, 2003 has been disclaimed.

[21] Appl. No.: 396,537

[22] Filed: Jul. 8, 1982

[30] Foreign Application Priority Data

Jul. 20, 1981 [EP] European Pat. Off. ........ 81303305.7

[51] Int. Cl.⁴ ............................................. F16M 11/12
[52] U.S. Cl. .................................... 248/179; 248/349; 248/393; 248/418; 248/425
[58] Field of Search ............... 248/179, 180, 349, 393, 248/418, 419, 425, 185, 371, 346, 397, 664, 415, 422, 183, 133, 143, 139, 663; 364/491

[56] References Cited

U.S. PATENT DOCUMENTS

| | | | |
|---|---|---|---|
| 2,922,609 | 1/1960 | Collier | 248/179 |
| 3,614,040 | 10/1971 | Martinez | 248/664 |
| 3,662,112 | 11/1971 | Stroh | 248/183 |
| 3,834,660 | 9/1974 | Leffler | 248/418 |
| 3,970,792 | 7/1976 | Benham et al. | 248/183 |
| 3,974,994 | 8/1976 | Petterson . | |
| 4,019,710 | 8/1977 | O'Connor et al. | 248/181 |
| 4,225,105 | 9/1980 | Nakamura | 248/185 |
| 4,247,069 | 1/1981 | Kurz | 248/185 |
| 4,349,173 | 9/1982 | Volka et al. | 248/183 |
| 4,354,654 | 10/1982 | Werner et al. | 248/663 |
| 4,365,779 | 12/1982 | Bates et al. | 248/179 |
| 4,368,867 | 1/1983 | Pendleton et al. | 248/678 |
| 4,395,010 | 7/1983 | Helgeland et al. | 248/183 |
| 4,410,159 | 10/1983 | McVicker et al. | 248/183 |
| 4,415,136 | 11/1983 | Knoll | 248/663 |

FOREIGN PATENT DOCUMENTS

| | | |
|---|---|---|
| 2516129 | 10/1976 | Fed. Rep. of Germany . |
| 2288434 | 10/1974 | France . |
| 2261509 | 1/1975 | France . |
| 1435513 | 5/1976 | United Kingdom . |

*Primary Examiner*—Ramon S. Britts
*Assistant Examiner*—Ramon O. Ramirez
*Attorney, Agent, or Firm*—Frederick D. Poag; Joseph J. Connerton

[57] ABSTRACT

A tiltable and/or rotatable support for a display device which includes a locking mechanism 19, 20, 21, 22, 23, 24 operable to lock the support in a selected tilt position while still permitting swivel adjustment. The support may be provided as a stand-alone unit or formed integral with the base of the display device.

9 Claims, 4 Drawing Figures

TILTABLE AND/OR ROTATABLE SUPPORT FOR DISPLAY DEVICE

FIELD OF THE INVENTION

The invention relates to a tiltable and/or rotatable support for a unit such as a display device.

BACKGROUND OF THE INVENTION

Description of the Prior Art

The IBM 6580 Display Station (IBM is a registered trade mark of International Business Machines Corporation) includes a display module which may be swivelled and/or tilted by an operator to adjust the viewing angle. The base of the display module has a central ribbed portion which is shaped to present a spherically contoured convex surface. This module is supported on a plinth which has a central spherically contoured concave surface which mates with the contoured surface on the underside of the module. The two surfaces are slidable, one over the other, to rotate and/or tilt the display module on the plinth. A shaped key-piece extends from the center of the convex surface on the underside of the module through an elongated aperture extending diagonally across the concave surface in a direction from front to back of the plinth. The shape of the key-piece serves to hold the module in place on the plinth while permitting tilting of the module within the limits dictated by the key-piece movable within the confines of the elongated slot. Rotation of the module is limited by a projecting lug extending upwards from the base into the spherical convex surface of the module where it engages ribs positioned to define the permitted rotational movement of the module. Wing pieces extend down from each side of the convex surface of the module to contact the plinth to provide lateral support for the module and to limit vibration. Further details of the construction of the tilt and/or rotate feature of the display module are to be found in the co-pending European Patent Application No. 81101628.6, and corresponding Ser. No. 159,553 filed on June 16, 1980 now U.S. Pat. No. 4,365,779, now U.S. Pat. No. 4,377,849.

IBM Technical Disclosure Bulletin Vol. 23, No. 7A, Dec. 1980, pages 2859/60 entitled "Swivel and tilt mechanism for display unit' by S. Futatsugi and M. Koboyashi, describes a mechanism similar to that incorporated in the IBM 6580 Display Station but additionally having a locking mechanism for clamping the display module, or cabinet, on the plinth, or pedestal, in the selected tilted and rotated position. The locking mechanism consists of a T-shaped shaft, or stopper, mounted for axial movement in the central hole in the concave spherical surface of the plinth and extending through a diagonally positioned elongated slot running from front to back across the convex surface of the underside of the display module. Although axially movable, the T-shaped shaft is otherwise fixed in a relation to the plinth with the cross-bar of the shaft aligned parallel to the front edge of the plinth. When assembled, the cross-bar of the shaft is only aligned with the elongated slot in the display module when the latter has been rotated through 90° with respect to the plinth. The T-shaped shaft serves therefore to secure the module to the plinth in all normal viewing positions. The module may be removed from the plinth if desired by rotating through 90° and lifting, allowing the cross-bar of the shaft to pass through the elongated slot. The cross-piece of the shaft is provided on its underside with a hard rubber layer which is normally held in frictional contact with the inside surface of the module base by means of a spring attached to the other end of the shaft exerting a force downwards into the plinth. When it is desired to adjust the display module swivel or tilt position, the clamp is released by means of a cam operated mechanism which lifts the shaft and thus the locking brake, constituted by the rubber coated cross-piece, from engagement with the inside surface of the base of the display module.

SUMMARY OF THE INVENTION

The present invention provides an improved tiltable and/or rotatable support suitable for a display device which may be in the form of a separate unit on which the display device is placed or alternatively, as in the prior art examples, with the top of the unit integrally formed as the base of the display device itself. The same basic principle is used as in the prior art in as much as tilt and swivel adjustment is achieved by means of two spherically contoured mating surfaces sliding one over the other. A locking mechanism is also provided but this differs from the prior art in that it functions to lock the unit in a selected tilt position while still permitting rotational swivel adjustment. The facility of being able to adjust the viewing position of the display device in two stages is a considerable advantage over the prior art especially when dealing with relatively heavy units such as large screen display devices. Additionally, by appropriate selection of materials, the rotational stiffness of the unit when in its locked position can be controlled.

In order that the invention may be fully understood, a preferred embodiment thereof will now be described with reference to the accompanying drawings.

DESCRIPTION OF A PREFERRED EMBODIMENT

Figure 1:
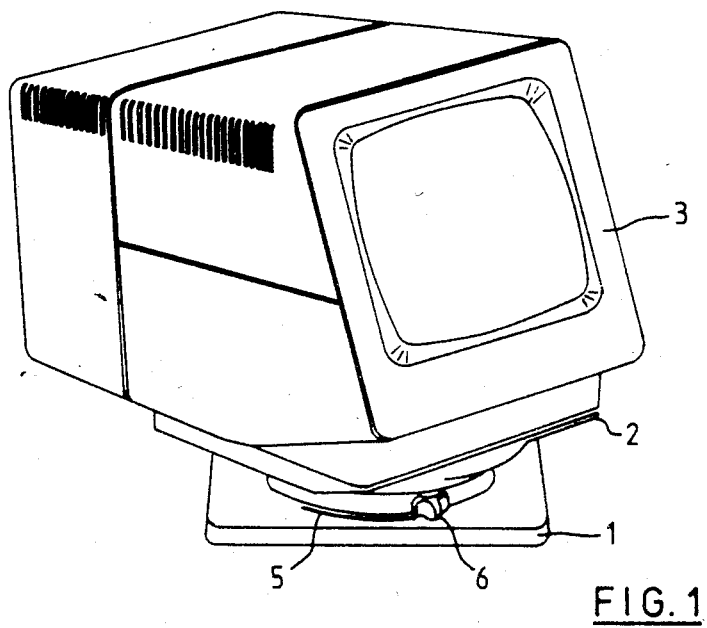
FIG. 1 shows in front perspective view, a CRT display device supported on a tiltable and/or rotatable support stand, according to the invention, in a rotated position.
Figure 2:
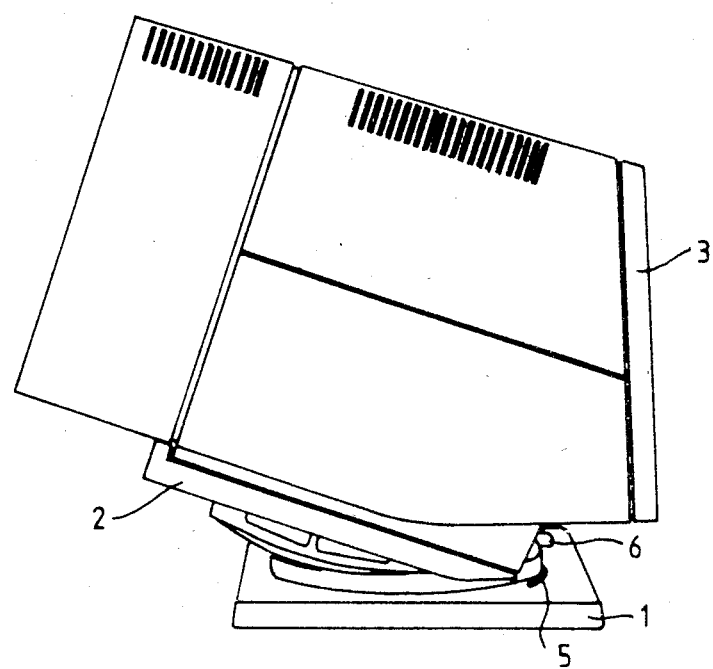
FIG. 2 shows in side perspective view a CRT display device supported on the support stand in a tilted position.

A tiltable and/or rotatable stand according to the invention shown in the figures, consists of two main components, a base member or plinth 1 and a top member or platform 2 upon which a display device 3 or some other unit is supported. The construction of the stand is such that the platform is rotatable through 90° in either direction from the front-facing position, and tiltable from the horizontal 5° in an upwards direction through to 20° in a downwards direction. FIG. 1 shows the stand with swivel adjustment and FIG. 2 shows it with tilt adjustment.

The two components 1 and 2 are held together by means of a locking mechanism extending through apertures in both components and operable by means of a lever 4 (FIG. 4) projecting through, and movable along a horizontal arcuate slot 5 in the plinth 1. The lever 4 carries a knob 6 shaped to enhance ease of operation. The arrangement according to the invention is such that with the knob 6 in its extreme left hand position in slot 5, the locking mechanism is released so that the platform 2 is free to rotate, or swivel, and tilt, or pivot, with respect to the plinth 1. With the knob 6 in its extreme right-hand position in slot 5, as shown in FIGS. 1 to 4, the locking mechanism is engaged so that thereafter the platform 2 is locked against tilting, or pivoting, but still adjustable by rotation, or swivelling. The stiffness of swivel adjustment can be controlled by appropriate selection of materials, and in the preferred embodiment, is arranged to be fairly stiff in order to prevent inadvertent movement of the display caused, for example, by accidental contact.

Figure 3:
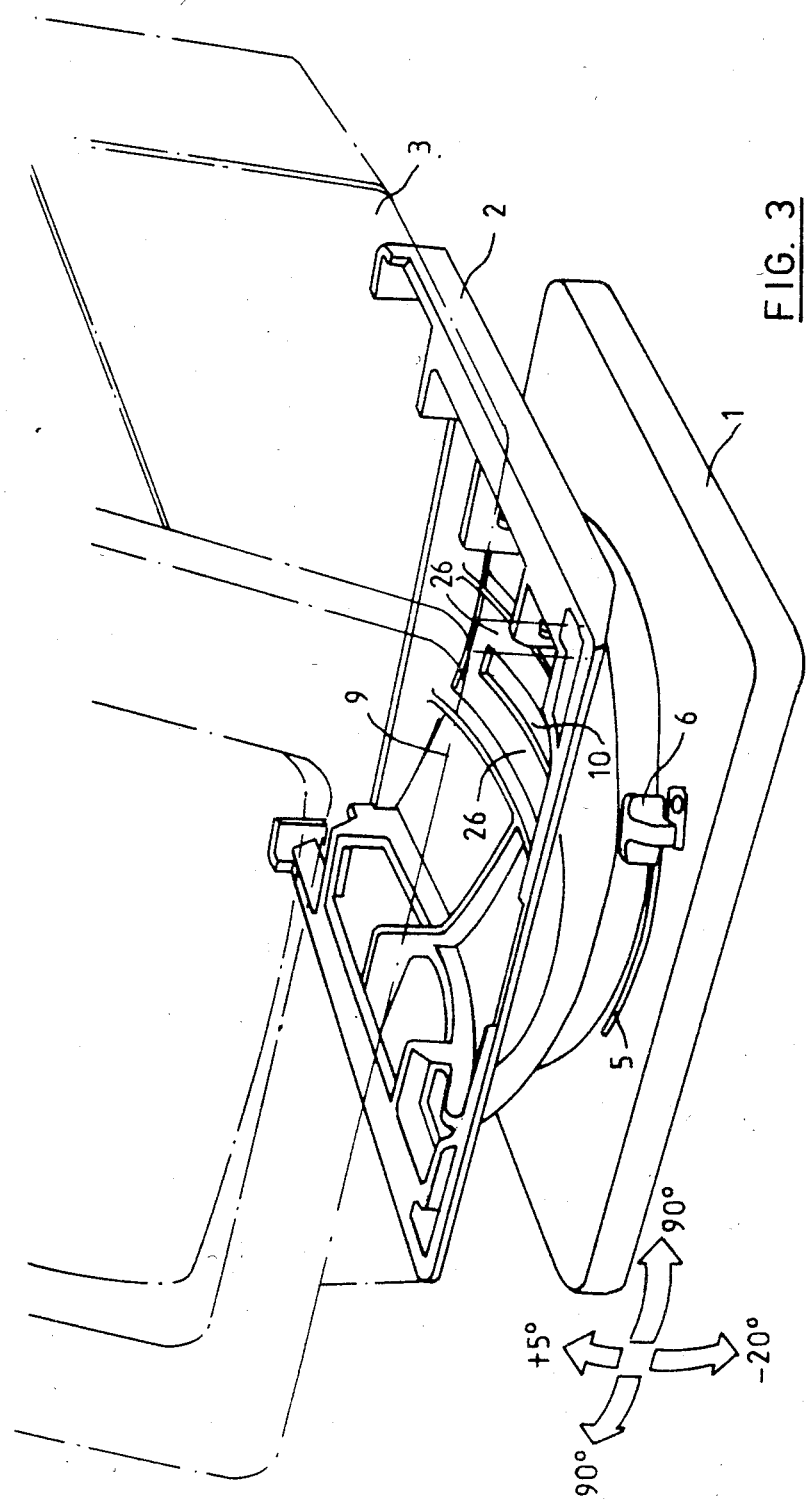
FIG. 3 shows a front perspective view of the support stand in the aligned forward-facing untilted position with a CRT display device, part shown in phantom, in place.
Figure 4:
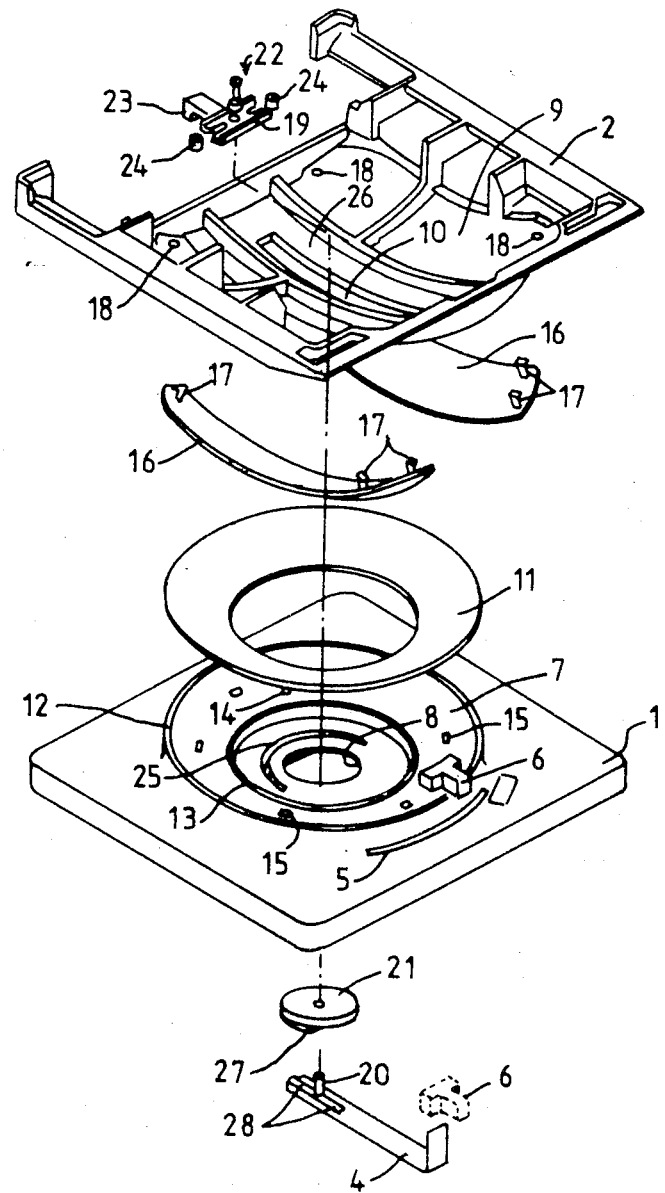
FIG. 4 shows the component parts of the support stand in exploded view.

A detailed description of the construction and operation of the support stand will now be given with reference to the exploded diagram shown in FIG. 4. The plinth 1 is formed as a rectangular base member having a central spherically contoured concave annular surface 7 surrounding a central circular aperture 8. The platform 2 is similarly formed as a rectangular top member having a central spherically contoured surface 9 matching the concave surface 7 and having a diagonal elongated slot 10 extending therethrough from the front to the back of the platform. In one form of construction according to the invention, the top member may be placed in direct contact with the base member with the convex surface of the base member. In the embodiment shown in FIG. 4, the plinth 1 and platform 2 are formed by moulding in structural foam which ensures that the device is sufficiently robust to support a heavy unit such as a display device but which does not have good wear and low friction properties desired. Accordingly, in the preferred embodiment described with reference to FIG. 4, the two contoured surfaces are additionally provided with low friction surfaces. Thus, an annular bearing surface 11 of low friction hard wearing material, with a correspondingly contoured profile to that of surface 7 is provided on the surface located between raised concentric rims 12 and 13 themselves formed during the moulding of the plinth. The annular bearing surface 11 is secured by a number of integral shaped clips 14 which snap-fit into correspondingly positioned holes 15 in the surface 7. The elongated slot 10 in the surface 9 prevents a similar annular bearing surface being used for the platform and accordingly two separate bearing surfaces 16 are provided located one on each side of the slot. The bearing surfaces are secured by further integral shaped clips 17 which snap-fit into correspondingly positioned holes 18 through the surface 9. With the plinth 1 and platform 2 mounted together as shown in FIG. 3, the mating bearing surfaces ensure smooth and easy adjustment of the stand by an operator.

The platform is secured to the plinth by means of a brake member 19 secured to, but free to rotate on, the free end of an axially tapped shaft or spindle 20 extending from the lever 4 and passing through a central hole in a circular cam device 21 and elongated slot 10. The cam device is held as a press-fit in aperture 8. The brake member is secured to the shaft 20 by means of a bolt and retaining washer 22 which, when screwed fully home, provides clearance to enable the brake member to be rotated on the end of the shaft.

The free end of a lug 23 integral with and extending backwardly and downwardly from the brake member 19 passes through elongated slot 10 and into an arcuate slot 25 formed in the inner region of surface 7. The brake member 19 is therefore constrained to rotate with the platform 2 during swivel adjustment, the amount of adjustment of the platform being determined by the length of arcuate slot 25 within which the lug 23 slides. Further, the amount of tilt adjustment is determined by the length of elongated slot 10 in the platform which is slidable forwards and backwards about the fixed axis of the shaft 20 and the lug 23. Two brake pads 24 are secured to the underside of laterally extending portions of the brake member 19 to lie above portions of the inside surface 26 of the platform located on each side of and extending parallel to, the slot 10. The underside of the cam device 21 has two identical camming surfaces 27 over which cam followers 28 on lever 4 ride as the lever is moved about its pivot along slot 5. The arrangement of the mechanism is such that movement of the lever 4 from its extreme left-hand position to the extreme right-hand in slot 5 is accompanied by movement of the cam followers along the camming surfaces, the profile of the latter being such that the shaft 20 is drawn axially down through the apertures by a predetermined amount. The relative size of the various component parts forming this brake mechanism are chosen so that with the lever 4 in the extreme left-hand position the brake pads 24 are clear of, or only make light contact with, the inner surface positions 26 but with the lever in the extreme right-hand position the brake pads are drawn hard into frictional engagement with the portions 26 to clamp the platform 2 firmly in the selected tilt position. Since the brake device 19 can rotate with the platform 2 and because the friction between the mating smooth contoured surfaces of the platform and plinth in considerably less than the friction between brake pads 24 and the inside surface 26 of the platform rotational adjustments can be made when the tilt adjustment is locked. This is especially the case in this preferred embodiment where additional low friction bearing surfaces have been provided.

Several variations of the support stand can be made without departing from the invention. First, as explained above, the additional bearing surfaces can be dispensed with provided the wear characteristics and friction between the two mating contoured surfaces are suitable. The support need not be made as a stand-alone unit, but can be integrated into the structure of the display device itself with the platform or top member formed from the base of the unit. The curvature of the mating surfaces can be reversed with the plinth having a convexly curved contoured surface mating with a concavely curved contoured surface on the platform. Further the locking mechanism can be inverted with the brake member acting on the lower surface of the plinth and the lever operating in a slot in the top member or platform. Other variations in specific details of construction will also be apparent.

What is claimed is:

1. A tiltable and rotatable support for a unit, for example a display device, comprising a base member and a top member having spherically contoured mating surfaces slidable one over the other forming a shallow ball and socket connection in order to tilt and rotate one member relative to the other member, and a locking mechanism interconnecting the members and operable to frictionally engage one member but to rotate relatively freely on the other member, the rotational axis of said locking mechanism being fixed with respect to said other member, said mechanism being arranged in operation to lock said members in position against relative-tilting while permitting relative rotation therebetween.

2. A tiltable and rotatable support for a unit, for example a display device, comprising a base member and a top member having spherically contoured mating surfaces, a shaft mounted on one of said members for axial movement and extending through apertures in the two surfaces with the aperture in said surface of the other of said members being in the form of an elongated slot, the arrangement being such that the members are rotatable relative to one another about said shaft and tiltable relative to one another by an amount determined by the longitudinal movement of the elongated slotted member about the shaft, and a locking mechanism including a brake element supported on one end portion of the shaft and operator means interposed between said shaft and said one member to move said shaft axially to bring said brake element into frictional engagement with the slotted member so as to clamp said base and top members together, characterized in that the operation of said locking mechanism as aforesaid serves to lock the base member and top member in position against tilting while still permitting relative rotation therebetween, said shaft being coupled rotatably at least one of said brake element and said one member so that said brake element is free to rotate with said elongated slotted member relative to said one member independent of said locking mechanism.

3. A tiltable and rotatable support as claimed in claim 2, in which detent means couples said brake element to said elongated slotted member to rotate therewith and further co-acts with the other member to limit rotation of the top member relative to the base member.

4. A tiltable and rotatable support as claimed in claim 3, in which said detent means comprises a lug rigidly attached to and projecting from said brake element, extending through said elongated slot to lie between two rotation limit stops provided on said other member, the extent of relative rotation between the top and base member being determined by the length of travel of said lug between the stops.

5. A tiltable and rotatable support as claimed in claim 4, in which said brake element includes a laterally extending member symmetrically pivoted on the end of said shaft, the portions of said laterally extending member projecting on each side of the shaft including parts formed from frictional material for contacting portions of said elongated slotted member lying respectively on each side of said elongated slot, and in which said locking mechanism includes a camming mechanism connected to the other end of the shaft operable to positively draw said friction material into frictional engagement with said portions and to clamp said two members together as aforesaid.

6. A tiltable and rotatable support as claimed in claim 5, in which said base member has a spherically contoured concave surface with a central aperture, said top member has a spherically contoured mating convex surface with said elongated slot extending diagonally from front to back therethrough, said brake element mounted on one end of said shaft for engagement with said top member and said camming mechanism being attached to the other end of said shaft and retained by said base member, the camming mechanism including a lever extending through a horizontal slot in said base member for operator access, whereby horizontal movement of the lever in one direction along the horizontal slot is translated by said camming mechanism into vertical movement to draw said brake element into clamping engagement with said top member and horizontal movement of the lever in the opposite direction is translated into vertical movement to release said brake element from said clamping engagement.

7. A tiltable and rotatable support as claimed in any one of claims 1, 2 and 3 to 6, in which said spherically contoured mating surfaces are provided with coatings of low friction material acting as bearing surfaces.

8. A tiltable and rotatable support as claimed in any one of claims 2 and 3 to 6, in which said spherically contoured mating surfaces are provided with bearing surfaces in the form of individual sheets of low friction material, the bearing surface for the elongated slotted member being provided by two such sheets extending one on each side of the slot and the bearing surface for the other member being provided as a single sheet generally of annular form.

9. A tiltable and rotatable support as claimed in claim 8, in which said sheets forming said bearing surfaces are provided with shaped clips integral therewith which snap-fit into correspondingly positioned holes in the associated top and bottom members.

* * * * *